Jan. 7, 1964  J. A. LAUCK  3,116,636
PUMP TEST ADAPTOR

Filed Feb. 29, 1960  2 Sheets-Sheet 1

INVENTOR.
JOHN A. LAUCK
BY
ATTORNEY

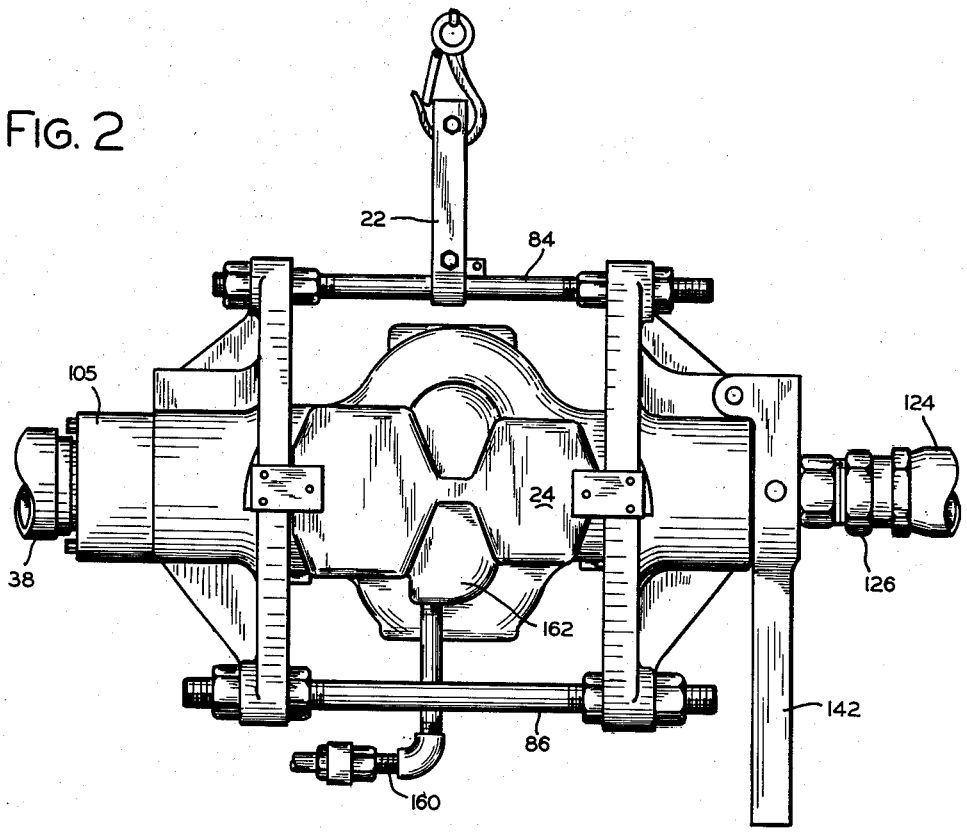
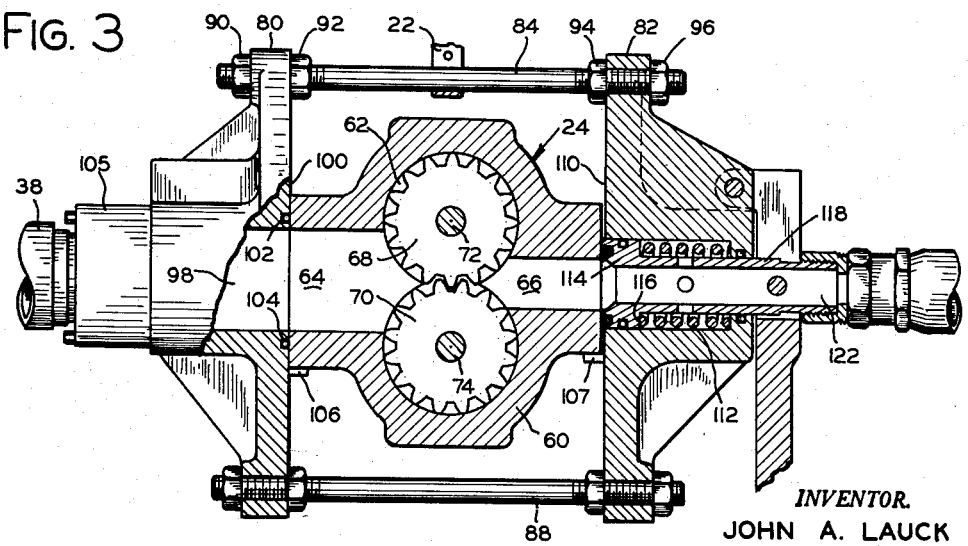

United States Patent Office 3,116,636
Patented Jan. 7, 1964

3,116,636
PUMP TEST ADAPTOR
John A. Lauck, Benton Harbor, Mich., assignor to Clark Equipment Company, a corporation of Michigan
Filed Feb. 29, 1960, Ser. No. 11,834
8 Claims. (Cl. 73—168)

The present invention relates to apparatus for use in pressure testing hollow articles, and more particularly to an apparatus for mounting pumps and similar devices in a fluid tight relation with the hydraulic system of a test stand or the like.

In conventional stands for testing pumps such as gear and other types of positive displacement pumps, the pump is mounted on the stand and, after being connected into the fluid system of the stand, is driven at predetermined speeds, and the performance and condition of the pump determined by observing the flow and torque meters on the test equipment. In making the test, the pumps are bolted down and connected into the hydraulic test system of the equipment with threaded pipes and fittings or by fixtures having opposed fitting plates bolted onto the pump flanges at the inlet and outlet openings of the pump. In either of these two methods of connecting the pumps into the hydraulic system, the fittings or bolts must be tightened and untightened each time a pump is tested, thus requiring considerable time and effort to mount the pumps on the stand preparatory to making the test, and thereafter removing the pumps from the fittings or fixture after the test has been completed. As a result of this time consuming and tedious operation, it had frequently been necessary to limit the testing operation, for example, to one pump out of every ten coming off the assembly line, thus making it possible for pumps having defective parts or giving substandard performance to escape detection and possible rejection. It is therefore one of the principal objects of the present invention to provide a pump testing apparatus having power driven means for creating a pump outlet pressure and an adaptor in which the pump under test can easily and quickly be mounted and secured into sealing engagement with the parts thereof by the movement of a single, easily operated lever, and which readily releases the pump from its sealing engagement with the pump parts as soon as the testing operation has been completed, the adaptor utilizing the test pump pressure to maintain an effective seal during testing of the pump.

Another object of the invention is to provide a pump testing apparatus having power driven means for creating a pump outlet pressure and an adaptor in which a seal is effected initially between the pump and parts of the adaptor by a manually operated means requiring relatively little force to operate, and which thereafter utilizes the pressure created by the pump under test to maintain an effective seal throughout the testing procedure.

Another object of the invention is to provide a hydraulic test stand having means for creating a pump outlet pressure and a pump adaptor which requires only a small mechanical force for effecting the initial seal between the adaptor and pump parts and which thereafter automatically increase the effectiveness of the seal with an increase in the pressure of the pump outlet pressure employed in the testing operation.

Further objects and advantages of the invention will become apparent from the following description and accompanying drawings, wherein:

FIGURE 2 is a side elevational view of the present adaptor showing it connected into the hydraulic system of the test stand and also showing a pump mounted in the adaptor in position for testing;

FIGURE 3 is a vertical cross sectional view of the adaptor and the pump mounted therein, as shown in FIGURE 2, taken on line 3—3 of FIGURE 1.

Figure 1:
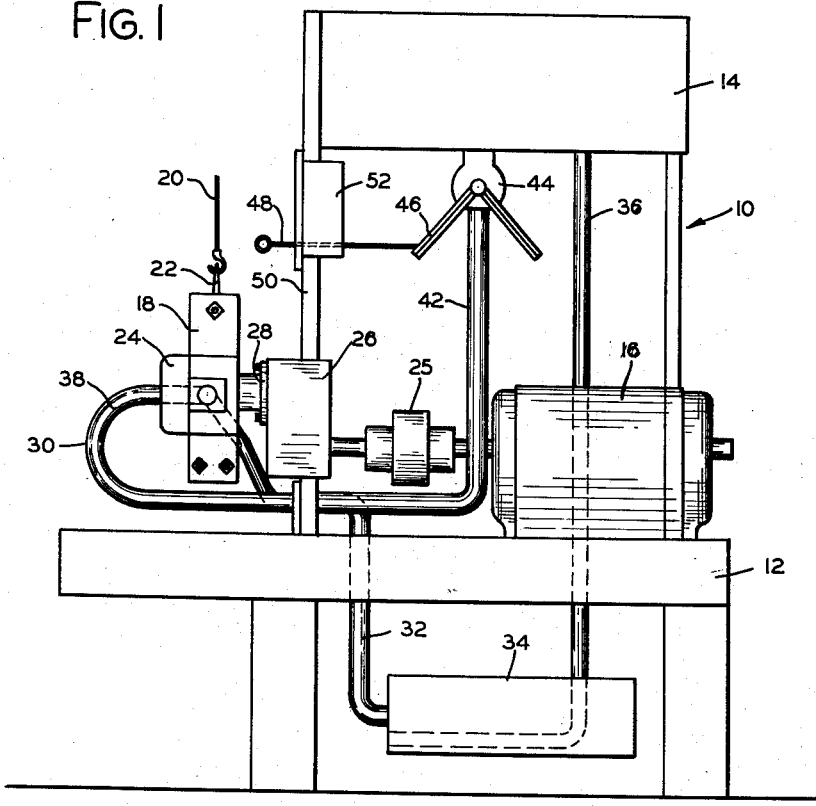
FIGURE 1 is a side elevational view of a test stand on which the present adaptor is used.
Figure 4:
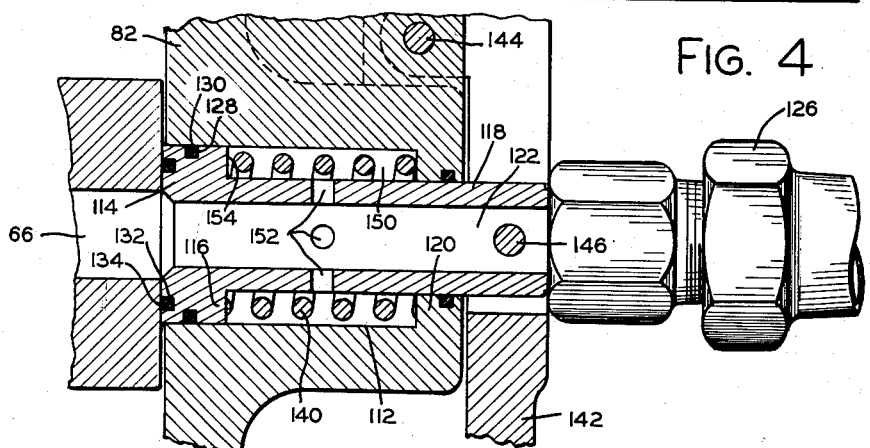
FIGURE 4 is an enlarged fragmentary vertical cross sectional view of a portion of the adaptor taken on the same plane as the one shown in FIGURE 3.

Referring more specifically to the drawings and to FIGURE 1 in particular, numeral 10 designates generally the test stand on which the present adaptor is used, 12 the frame of the stand, 14 a reservoir for the hydraulic fluid used in the system of the stand, 16 an electric motor mounted on frame 12 and adapted to drive the pump being tested, and 18 the present adaptor which is supported from the frame by a cable 20 and fixture 22 and in which a pump 24 is shown mounted for testing. The pump is connected to motor 16 through a coupling 25, gear reduction mechanism 26, and power take-off 28, and is connected at its inlet to reservoir 14 by conduit 30 and at its outlet by conduit 32 to cooling coils 34, which in turn are connected to the reservoir by return conduit 36. Condit 30 consists of a flexible section 38 connected to adaptor 18 and a pipe section 42 connected at its upper end to the bottom of reservoir 14 and at its bottom end to flexible section 38, the pipe section containing a valve 44 controlled by the test stand operator through a lever 46 and a rod 48 extending from the valve through the test stand instrument panel 50. The instrument panel contains a number of controls for the test stand and the flow and torque meters, one of which is shown at numeral 52. The test stand just described and the components and instruments thereof, apart from those comprising the present adaptor, are for the purpose of the description considered to be conventional or standard equipment, most of which is readily available on the market, and thus will not be described in detail herein. Pump 24 shown is a conventional gear type, consisting of a casing 60 having a pump chamber 62, fluid inlet passage 64, fluid outlet passage 66, and two intermeshing gears 68 and 70 disposed in chamber 62 and mounted on shafts or pins 72 and 74, respectively. The gears are driven from power take-off 28 through one of shafts 72 or 74 and hydraulic fluid is supplied from reservoir 14 through conduit 30 to pump inlet passage 64 and returned from pump outlet passage 66 to the reservoir through conduit 32, coils 34 and conduit 36. While the gear type pump is shown in connection with the present embodiment of the adaptor, other types of pumps may be tested in the particular adaptor shown or in modified forms thereof. However, the particular adaptor is adjustable within limits to pumps of different sizes, as will be explained more fully hereinafter. It will be apparent hereinafter that the pump mounted in operative position on the test stand is essential to the operation of the adaptor illustrated in the drawings.

Adaptor 18 has a head plate 80 and a tail plate 82 rigidly connected by three rods 84, 86 and 88, each rod extending through aligned holes in the two plates and being held firmly in place therein by nuts 90 and 92 threaded onto one end of each rod on opposite sides of head plate 80, and nuts 94 and 96 threaded onto the other end of each rod on opposite sides of tail plate 82. The distance between the two plates can be varied to accommodate pumps of different sizes by rotating the nuts on either end of the rods inwardly or outwardly, and the distance between the two plates is normally initially adjusted and maintained in the adjusted position throughout a particular production schedule. Head plate 80 contains a fluid passage 98 of substantially the same size as pump inlet passage 64, and a flat smooth inner surface 100 facing the pump inlet and containing an annular groove 102 surrounding passage 98 and containing an O-ring gasket 104 for seating against and forming a fluid tight seal with the face of the pump surrounding inlet passage 64. Flexible conduit section 38 in firmly connected by coupling 105 with head plate 80 and supplies hydraulic fluid from reservoir 14 to passage 98 and pump inlet 64. In order to initially assist in positioning the pump in the adaptor with the inlet passage 64 in direct alignment with passage 98, lugs or bosses 106 and 107 are provided on the inner faces of the two plates for supporting the pump until it is firmly gripped in the adaptor, as will be explained more fully hereinafter.

Tail plate 82 is provided with a flat inner surface 110 and contains a cylindrical chamber 112 of a diameter somewhat larger than the diameter of the pump outlet passage 66. Reciprocably mounted in chamber 112 is a piston 114 with an enlarged end portion 116 and a stem 118 extending outwardly through the end wall 120 of chamber 112 and having a longitudinal passage 122 extending completely through the piston, including stem 118. Flexible section 124 of return conduit 32 is connected to the outer end of stem 118 by a coupling 126. Piston 114 contains an annular groove 128 in the periphery of the enlarged portion with an O-ring 130 to form an effective seal between the piston and the wall of chamber 112 and an annular groove 132 in the face of the enlarged portion with an O-ring 134 to form an effective seal between the piston and the surface of the pump surrounding outlet passage 66. A coil spring 140 is mounted around stem 118 and reacts between enlarged end portion 116 and wall 120 to constantly urge piston 114 toward the pump and to seat O-ring 134 firmly on the pump surface surrounding outlet 66.

The piston 114 is manually withdrawn from the pump by a lever 142 pivoted to tail plate 82 by a pin 144 above chamber 112 and pivotally connected to stem 118 by a pin 146 extending through a bifurcated portion of lever 142 and through the stem. Passage 122 of the stem is connected to chamber 112 in space 150 surrounding the stem by a plurality of ports 152 for transmitting the pump created pressure in outlet 66 and in passage 122 into space 150, where the pressure reacts against surface 154 of enlarged end portion 116 and urges O-ring 134 against the surface of the pump surrounding outlet 66 with sufficient force to maintain an effective seal regardless of the pressures created by the pump. In this construction, the area of surface 154 must be substantially larger than the area of the surface on the end of piston 114 between passage 122 and O-ring 134, where the effective seal is created and maintained between the pump and piston, to provide a substantial differential in pressure urging the O-ring against the pump surface and also the pump surface against O-ring 104.

In the operation of the present adaptor on a pump test stand such as the one shown in FIGURE 1 of the drawings, the pump to be tested is mounted on the stand with the pump drive shaft connected to power take-off 28, and the adaptor is mounted in position on the pump. In mounting the adaptor, the lower end of lever 142 is moved to the right, as viewed in FIGURES 2 and 3, thus withdrawing piston 114 sufficiently to permit a pump to be inserted in the adaptor and seated on bosses 106 and 107. When the lever is released by the operator, spring 140 seats O-ring 134 against the pump surface surrounding outlet 66 and forms a seal between the pump and piston 144 and a seal between the pump and O-ring 104. To sense the case pressure, a conduit 160 is connected to port 162 and to a gauge (not shown) on panel 50. In performing the testing operation, valve 44 is opened supplying hydraulic fluid through conduit 30 to inlet 64 of the pump and the pump is driven by motor 16, thereby creating the desired pressure in pump outlet 66, passage 122, and conduit 32 to the gauges on panel 50. The pump pressure is transmitted from passage 122 through ports 152 into space 150, and reacts against surface 154 to form an effective seal between O-rings 104 and 134 and the respective ends of the pump casing. After the test has been completed, the operation of the pump is stopped, thereby relieving substantially all the pressure in space 150, and leaving spring 140 as the only effective force seating the O-rings onto the pump casing. The operator can easily release the pump from the adaptor by merely moving the lower end of lever 142 to the right to withdraw piston 114 from the pump. From the foregoing it is seen that only a single manual lever manipulation with very little physical effort on the part of the operator is required to mount a pump in the adaptor and maintain it therein in fluid tight relationship with the hydraulic system. It is also seen that the power mechanism which follows the manual manipulation is relatively simple and compact and requires no special hydraulic system for its complete and effective operation.

While only one embodiment of the adaptor apparatus has been described in detail herein, various changes and modifications may be made without departing from the scope of the present invention.

I claim:

1. For testing pumps having a fluid inlet and a fluid outlet on opposite sides thereof, the combination of a pump drive means for creating a pump outlet pressure, and an adaptor, said adaptor comprising a head plate, a tail plate spaced from said head plate, said plates having parallel inner surfaces and aligned passages therethrough, the passage in said tail plate being cylindrical in shape and larger in diameter than the outlet of the pump being tested, means forming an outer end wall for said tail plate passage having an opening therethrough, rod means for rigidly holding said plates in spaced relation to provide a space therebetween for receiving a pump to be tested, means for connecting the passage in the head plate with a source of hydraulic fluid, a gasket around the passage in said head plate on the inner surface thereof for seating on the pump around the inlet thereof, a piston in the passage of said tail plate having one end facing the outlet of the pump and movable toward and away from the pump, a stem of smaller diameter than said piston joined to the other end of said piston and extending outwardly through the opening in said end wall, said piston and stem having a longitudinal passage extending therethrough and said stem having a port connecting said longitudinal passage to the passage in said tail plate for admitting pump outlet pressure into said tail plate passage, a gasket on the first mentioned end of said piston around the passage therethrough for seating on the pump around the outlet thereof, the area of said piston externally from said stem being greater than the area of said piston internally from the point of engagement with the pump, a coil spring around said stem urging the piston in the direction to seat the gasket thereof onto the pump around the outlet, a lever pivoted on said tail plate and connected to said stem for withdrawing said piston from the pump, and means for connecting the passage in said stem with a fluid return line.

2. For testing pumps having a fluid inlet and a fluid outlet on opposite sides thereof, the combination of a pump drive means for creating a pump outlet pressure, and an adaptor, said adaptor comprising a head plate, a tail plate spaced from said head plate, said plates having parallel inner surfaces and aligned passages therethrough, the passage in said tail plate being cylindrical in shape and larger in diameter than the outlet of the pump being tested, means forming an outer end wall for said tail plate passage having an opening therethrough, adjustable means for rigidly holding said plates in spaced relation to provide a space therebetween for receiving a pump to be tested, means for connecting the passage in the head plate with a source of hydraulic fluid, a gasket around the passage in said head plate on the inner surface thereof for seating on the pump around the inlet thereof, a piston in the passage of said tail plate having one end facing the outlet of the pump and movable toward and away from the pump, a stem joined to the other end of said piston and extending outwardly through the opening in said end wall, said piston and stem having a longitudinal passage extending therethrough and said stem having a port connecting said longitudinal passage to the passage in said tail plate for admitting pump outlet pressure into said tail plate passage, a gasket on the first mentioned end of said piston around the passage therethrough for seating on the pump around the outlet thereof, the area of said piston externally from said stem being greater than the area of said piston internally from the point of engagement with the pump, a spring around said stem urging the piston in the direction to seat the gasket thereof onto the pump around the outlet, a lever for withdrawing said piston from the pump, and means for connecting the passage in said stem with a fluid return line.

3. For use in testing pumps having a fluid inlet and a fluid outlet on opposite sides thereof, the combination of a pump drive means for creating a pump outlet pressure, and an adaptor, said adaptor comprising a head plate, a tail plate, said plates having aligned passages therein, the passage in said tail plate being cylindrical in shape and larger in diameter than the outlet of the pump being tested, means forming an outer end wall for said tail plate passage having an opening therethrough, means for rigidly holding said plates in spaced relation, conduit means for connecting the passage in said head plate with a source of hydraulic fluid, a piston in the passage of said tail plate having one end facing the outlet of the pump and movable toward and away from the pump, a stem joined to the other end of said piston and extending outwardly through the opening in said end wall, said piston and stem having a longitudinal passage extending therethrough and said stem having a port connecting said longitudinal passage to the passage in said tail plate for admitting pump outlet pressure into said tail plate passage, the area of said wall internally from the point of engagement with the pump being smaller than the opposite side of said wall subjected to the outlet pressure of the pump, a spring around said stem urging the piston in the direction of the pump, a means for withdrawing said piston from the pump, and conduit means for connecting the passage in said tail plate with a fluid return line.

4. For testing pumps having a fluid inlet and a fluid outlet on opposite sides thereof, the combination of a pump drive means for creating a pump outlet pressure, and an adaptor, said adaptor comprising a head plate, a tail plate, said plates having passages therein, the passage in said tail plate being cylindrical in shape and larger in diameter than the outlet of the pump being tested, means forming an outer end wall for said tail plate passage having an opening therethrough, means for rigidly holding said plates in spaced relation to provide a space therebetween for receiving a pump to be tested, means for connecting the passage in the head plate with a source of hydraulic fluid, a piston in the passage of said tail plate having one end facing the outlet of the pump and movable toward and away from the pump, means defining a longitudinal opening through said piston for admitting pump outlet pressure into said tail plate passage, a stem joined to the other end of said piston and extending outwardly through the opening in said end wall, the area of said piston externally from said stem being greater than the area of said piston internally from the point of engagement with the pump, a spring in the passage of said tail plate urging the piston in the direction of the pump, a means connected to said stem for withdrawing said piston from the pump, and means for connecting the passage in said tail plate with a fluid return line.

5. For use in testing pumps having a fluid inlet and a fluid outlet, the combination of a pump drive means for creating a pump outlet pressure, and an adaptor, said adaptor comprising a head plate, a tail plate, said plates having passages therethrough, the passage in said tail plate being cylindrical in shape and larger in diameter than the outlet of the pump being tested, means forming an outer end wall for said tail plate passage having an opening therethrough, means for rigidly holding said plates in spaced relation, means for connecting the passage in the head plate with a source of hydraulic fluid, a piston in the passage of said tail plate having one end facing the outlet of the pump and movable toward and away from the pump, means defining a longitudinal opening through said piston for admitting pump outlet pressure into said tail plate passage, a stem joined to the other end of said piston and extending outwardly through the opening in said end wall, the area of said piston externally from said stem being greater than the area of said piston internally from the point of engagement with the pump, a means connected to said stem for withdrawing said piston from the pump, and means for connecting the passage in said tail plate with a fluid return line.

6. For testing pumps having a fluid inlet and a fluid outlet, the combination of a pump drive means for creating a pump outlet pressure, and an adaptor, said adaptor comprising a head plate, a tail plate, said plates having passages therethrough, the passage in said tail plate being cylindrical in shape and larger in diameter than the outlet of the pump being tested, means forming an outer end wall for said tail plate passage, means for rigidly holding said plates in spaced relation to provide a space therebetween for receiving a pump to be tested, means for connecting the passage in said head plate with a source of hydraulic fluid, and a wall in said tail plate passage movable by the outlet pressure of the pump being tested into firm engagement with the portion of said pump defining the outlet thereof, the area of said wall internally from the point of engagement with the pump being smaller than the opposite side of said wall subjected to the outlet pressure of the pump.

7. For a stand for testing pumps having a fluid inlet and a fluid outlet on opposite sides thereof, the combination of a pump drive means for creating a pump outlet pressure, and an adaptor, said adaptor comprising a head plate, a tail plate, said plates having aligned passages therethrough, the passage in said tail plate being larger than the outlet of the pump being tested, means forming an outer end wall for said tail plate passage, means for rigidly holding said plates in spaced relation, means associated with said head plate for connecting the passage therein with a source of hydraulic fluid, a wall in said tail plate passage movable to and from the pump and having an opening therethrough connecting the pump outlet with said passage behind said wall for utilizing the outlet pressure of the pump being tested to move said wall into engagement with the pump, the area of said wall externally from said stem being greater than the area of said wall internally from the point of engagement with the pump, a coil spring in said passage urging said wall into engagement with the pump around the outlet, a stem connected to said wall and extending through said tail plate, a lever connected to said stem for withdrawing said wall from the pump, and means associated with said tail plate for connecting the passage therein with a fluid return line.

8. For testing pumps having a fluid inlet and a fluid outlet on opposite sides thereof, the combination of a pump drive means for creating a pump outlet pressure, and an adaptor, said adaptor comprising a head plate, a tail plate, said plates having passages therein, the passage in said tail plate being larger than the outlet of the pump being tested, means for rigidly holding said plates in spaced relation to provide a space therebetween for receiving a pump to be tested, means for connecting the passage in the head plate with a source of hydraulic fluid, a wall in said tail plate passage movable to and from the pump and having an opening therethrough connecting the pump outlet with said passage behind said wall for utilizing the outlet pressure of the pump being tested to move said wall into engagement with the pump, the area of said wall internally from said point of engagement with the pump being smaller than the opposite side of said wall subjected to the outlet pressure of the pump, means for withdrawing and advancing said wall relative to the pump, and means for connecting the passage in said tail plate with a fluid return line.

References Cited in the file of this patent

UNITED STATES PATENTS

| | | |
|---|---|---|
| 2,098,677 | Saballus et al. | Nov. 9, 1937 |
| 2,279,969 | Casperson | Apr. 14, 1942 |
| 2,581,536 | Johns | Jan. 8, 1952 |
| 2,845,941 | Wagner | Aug. 5, 1958 |
| 2,873,764 | Lombard et al. | Feb. 17, 1959 |
| 2,934,943 | Carrie | May 3, 1960 |
| 3,002,769 | Deubler et al. | Oct. 3, 1961 |